US009692504B2

United States Patent
Shimizu et al.

(10) Patent No.: US 9,692,504 B2
(45) Date of Patent: Jun. 27, 2017

(54) OPTICAL TRANSPORT SYSTEM

(71) Applicant: MITSUBISHI ELECTRIC CORPORATION, Chiyoda-ku (JP)

(72) Inventors: Hidenori Shimizu, Chiyoda-ku (JP); Yoshiaki Konishi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/780,855

(22) PCT Filed: May 17, 2013

(86) PCT No.: PCT/JP2013/063817
§ 371 (c)(1),
(2) Date: Sep. 28, 2015

(87) PCT Pub. No.: WO2014/184955
PCT Pub. Date: Nov. 20, 2014

(65) Prior Publication Data
US 2016/0056887 A1  Feb. 25, 2016

(51) Int. Cl.
*H04B 10/032* (2013.01)
*H04J 3/14* (2006.01)
(Continued)

(52) U.S. Cl.
CPC .......... *H04B 10/032* (2013.01); *H04J 3/14* (2013.01); *H04Q 11/0066* (2013.01); *H04J 3/1652* (2013.01); *H04Q 2011/0081* (2013.01)

(58) Field of Classification Search
CPC .................................................. H04B 10/032
See application file for complete search history.

(56) References Cited

U.S. PATENT DOCUMENTS 5,903,370 A    5/1999  Johnson
7,099,578 B1 * 8/2006  Gerstel .............. H04J 14/0295
                                            370/216
(Continued)

FOREIGN PATENT DOCUMENTS

JP    2005-012306 A    1/2005
JP    2006-287419 A   10/2006

OTHER PUBLICATIONS

"Interfaces for the Optical Transport Network (OTN)" International Telecommunication Union, ITU-T G.709N.1331, Total 25 pages (Dec. 2009).
(Continued)

*Primary Examiner* — Shi K Li
(74) *Attorney, Agent, or Firm* — Oblon, McClelland, Maier & Neustadt, L.L.P.

(57) ABSTRACT

An optical transport system includes: uplink transponders opposed to construct an uplink transport path, to transport an OTU frame, redundant uplink transponders opposed to construct a redundant system uplink transport path, to transport the OTU frame, downlink transponders opposed to construct a downlink transport path, to store maintenance information in the OTU overhead of the OTU frame and transport this OTU frame when a failure occurs in the uplink transport path; optical switches to connect between client transport devices, and the uplink transport path and the redundant system uplink transport path such that switching between these uplink transport paths can be performed, to switch from the uplink transport path to the redundant system uplink transport path on the basis of the maintenance information.

14 Claims, 11 Drawing Sheets

(51) Int. Cl.
*H04Q 11/00* (2006.01)
*H04J 3/16* (2006.01)

(56) References Cited

U.S. PATENT DOCUMENTS

| | | | | |
|---|---|---|---|---|
| 2003/0198226 | A1* | 10/2003 | Westberg | H04L 29/06 370/393 |
| 2007/0269218 | A1* | 11/2007 | Zhang | H04J 3/1652 398/140 |
| 2008/0080860 | A1 | 4/2008 | Katagiri | |
| 2012/0263452 | A1 | 10/2012 | Shirai et al. | |
| 2013/0071117 | A1* | 3/2013 | Pan | H04J 3/12 398/45 |
| 2013/0243428 | A1* | 9/2013 | Mutoh | H04J 3/1652 398/45 |

OTHER PUBLICATIONS

International Search Report issued on Jul. 16, 2013 for PCT/JP2013/063817 filed on May 17, 2013.
Extended European Search Report issued Dec. 15, 2016 in Patent Application No. 13884434.5.

* cited by examiner

OPTICAL TRANSPORT SYSTEM

FIELD OF THE INVENTION

The present invention relates to an optical transport system that causes maintenance devices each of which uses two types of maintenance service switching protocols to coexist by incorporating a maintenance service switching protocol into the OTU overhead of an optical channel transport unit (OTU) frame.

BACKGROUND OF THE INVENTION

For a transport system with an optical submarine cable, there has been a request to use a redundant system optical transport system as the maintenance functions of optical transport devices in preparation for a failure occurring in a submarine cable. An outline diagram of the redundant system optical transport system is shown in FIG. 10.

Figure 10:
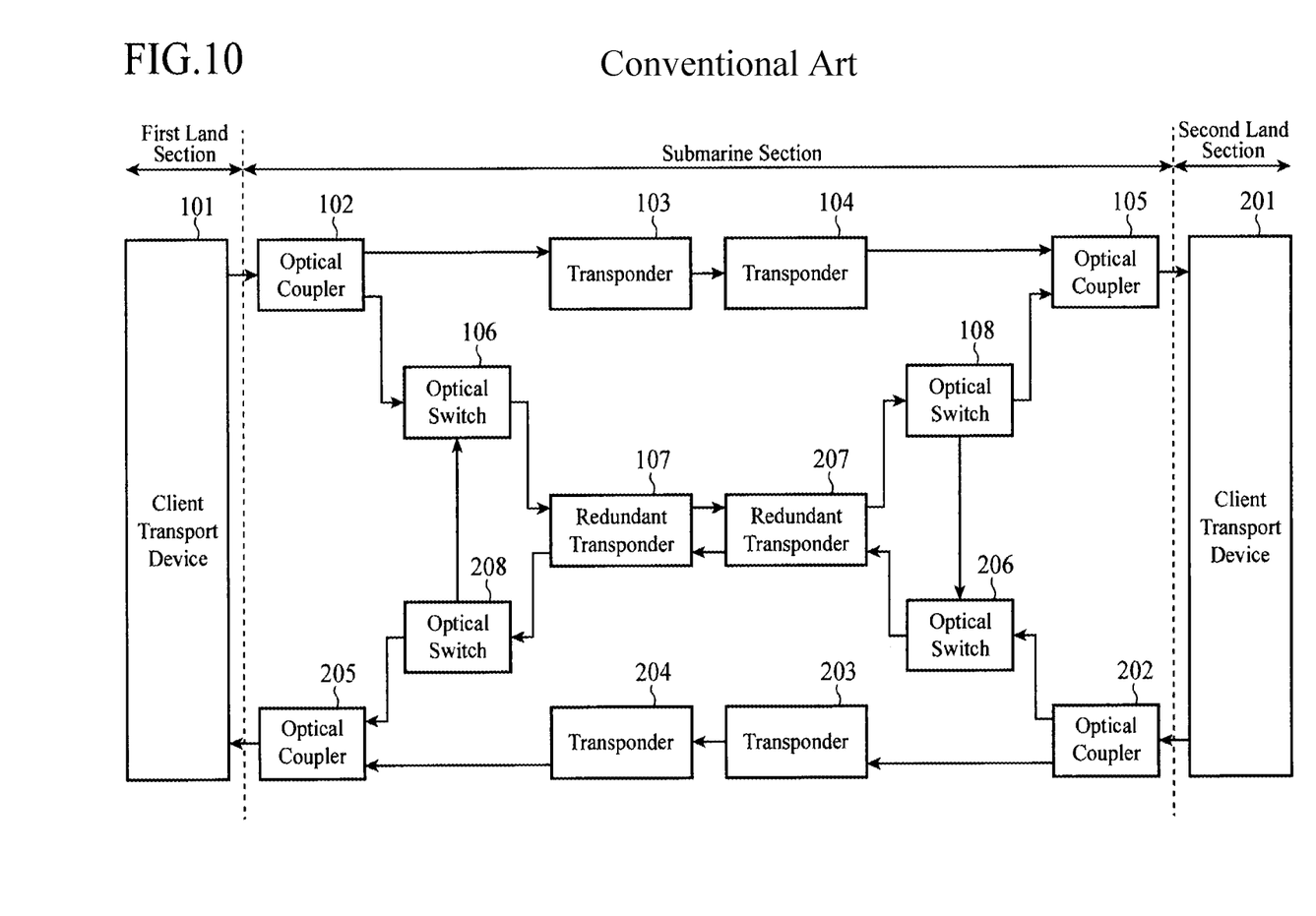
FIG. 10 is an outline diagram showing the configuration of a conventional redundant system optical transport system.

As shown in FIG. 10, a client transport device 101 that is network protection equipment (NPE) placed in a first land section has an output port connected to an optical coupler 102. The optical coupler 102 has an output port connected to a transponder 103, and another output port connected to an optical switch 106. Further, the optical switch 106 has input ports respectively connected to the optical coupler 12 and an optical switch 208, and selects one of them as an input source according to a control signal from a monitoring control unit (not shown). Further, the optical switch 106 has an output port connected to a redundant transponder 107. The above-mentioned optical coupler 102, the above-mentioned transponder 103, the above-mentioned optical switch 106, the above-mentioned optical switch 208, the above-mentioned redundant transponder 107, the above-mentioned monitoring control unit, and a transponder 204 and an optical coupler 205, for which an explanation will be omitted hereafter, are disposed in a land terminal station on a first land section side of a submarine section.

Then, when the redundant system optical transport system is in a normal operation state, a client signal sent out from the client transport device 101 is inputted, via the optical coupler 102, to the transponder 103. Outputted light from the transponder 103 is inputted to a transponder 104, which is opposite to the transponder 103, via an optical submarine cable. After that, the outputted light from the transponder 104 is inputted to a client transport device 201 placed in a second land section via an optical coupler 105. The above-mentioned transponder 104, the above-mentioned optical coupler 105, a redundant transponder 207 and an optical switch 206, which will be described below, an optical coupler 202 for which an explanation will be omitted hereafter, and a monitoring control unit (not shown) are disposed in a land terminal station on a second land section side of the submarine section.

Further, the optical switch 106 selects the optical switch 208 as the input source thereof, and the optical switch 208 selects the optical switch 106 as the output destination thereof. The optical switch 206 selects the optical switch 108 as the input source thereof, and the optical switch 108 selects the optical switch 206 as the output destination thereof. As a result, the four optical switches 106, 108, 206, and 208 and the two redundant transponders 107 and 207 are configured to have a form in which a signal (OTU frame) loops through them.

The same goes for a path extending from the client transport device 201 to the client transport device 101, and the explanation of the path will omitted hereafter.

On the other hand, when a failure occurs in the optical submarine cable, the monitoring control unit detects this failure and controls the optical switch 106 to select the optical coupler 102 as the input source thereof. The monitoring control unit further changes the output destination of the optical switch 108 to the optical coupler 105. As a result, the outputted light (client signal) from the optical coupler 102 is outputted to the redundant transponder 107 via the optical switch 106. Then, the outputted light from the redundant transponder 107 is inputted to the redundant transponder 207, which is opposite to the redundant transponder 107, via the optical submarine cable. The outputted light from the redundant transponder 207 is then inputted to the client transport device 201 via the optical switch 108 and the optical coupler 105.

The same goes for the path extending from the client transport device 201 to the client transport device 101 at the time of the occurrence of the failure, and the explanation of the path will omitted hereafter.

The ITU-T recommendation G.709 standard "Interfaces for the Optical Transport Network (OTN)" is standardized as the maintenance service switching protocol associated with the switching control on optical switches at the time of the occurrence of a failure, and is used in an optical transport system (for example, refer to nonpatent reference 1).

Figure 11:
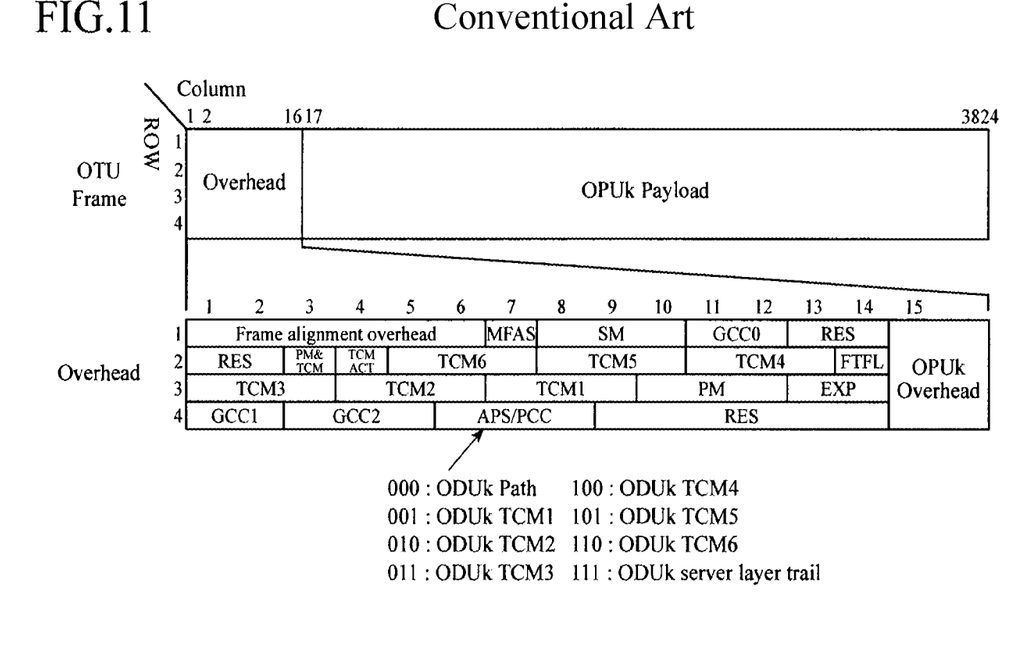
FIG. 11 is an outline diagram of OTU overhead mapping which complies with the ITU-T recommendation G.709 standard.

The OTU overhead mapping defined in the ITU-T recommendation G.709 standard is shown in FIG. 11. In the OTU overhead mapping shown in FIG. 11, an OPUk payload is a location where transmit information is stored, and an overhead is a location which is attached to the head of the payload and where transport information and a transport path alarm are stored. According to the ITU-T recommendation G.709 standard, APS/PCC (Automatic Protection Switching Coordination channel/Protection Communication Control channel) bytes which are a switching overhead area are used for monitoring control.

RELATED ART DOCUMENT

Nonpatent Reference

Nonpatent reference 1: ITU-T recommendation G.709 "Interfaces for the Optical Transport Network (OTN)"

SUMMARY OF THE INVENTION

Problems to be Solved by the Invention

In a case in which a plurality of pieces of maintenance equipment on a transport path, which are connected in series, perform maintenance service switching (switching of optical switches) using conventional APS/PCC bytes, more specifically, maintenance equipment in a land section and maintenance equipment in a submarine section perform maintenance service switching using conventional APS/PCC bytes, each of the pieces of equipment must be able to use an overhead area separately according to the contents of the maintenance service switching on each section. However, the APS/PCC bytes are mapped onto an ODU (Optical channel data unit) area (ODU overhead) which is used in the land section. A problem is therefore that when the APS/PCC bytes are used in the submarine section, the maintenance service switching using the APS/PCC bytes by way of the submarine section cannot be performed in the land section, the pieces of maintenance equipment cannot coexist in the land optical transport system and in the submarine optical transport system.

Further, in a case in which an OTU is used for a client interface in the first place, as to the ODU area of an OTU frame which is generated and terminated from end to end of a line, transparent communications (communications which do not change the contents of the ODU area) need to be implemented for client transport devices, and therefore the APS/PCC bytes cannot be changed in the submarine section. A problem is therefore that when using an OTU interface, the maintenance service switching system using conventional APS/PCC bytes cannot be applied to the maintenance service switching in the submarine section.

The present invention is made in order to solve the above-mentioned problems, and it is therefore an object of the present invention to provide an optical transport system that enables a maintenance service switching function for land section and a maintenance service switching function for submarine section to coexist.

Means for Solving the Problem

In accordance with the present invention, there is provided an optical transport system that is connected to client transport devices transmitting a client signal, and that includes the client signal in an OTU frame and transports this OTU frame, the optical transport system including: uplink transponders opposed to construct an uplink transport path, to transport the OTU frame; redundant uplink transponders opposed to construct a redundant system uplink transport path, to transport the OTU frame; downlink transponders opposed to construct a downlink transport path, to store maintenance information in the OTU overhead of the OTU frame and transport the OTU frame when a failure occurs in the uplink transport path; optical switches to connect between the client transport devices, and the uplink transport path and the redundant system uplink transport path in such a way as that switching between the uplink transport path and the redundant system uplink transport path can be performed, to switch from the uplink transport path to the redundant system uplink transport path on the basis of the maintenance information.

Advantages of the Invention

Because the optical transport system in accordance with the present invention (submarine section) is configured as above, the optical transport system enables a maintenance service switching function for land section and a maintenance service switching function for submarine section to coexist by storing maintenance information in OTU overheads which are not used for storage of maintenance information about a client transport device (land section).

EMBODIMENTS OF THE INVENTION

Hereafter, the preferred embodiments of the present invention will be explained in detail with reference to the drawings.

Embodiment 1

Figure 1:
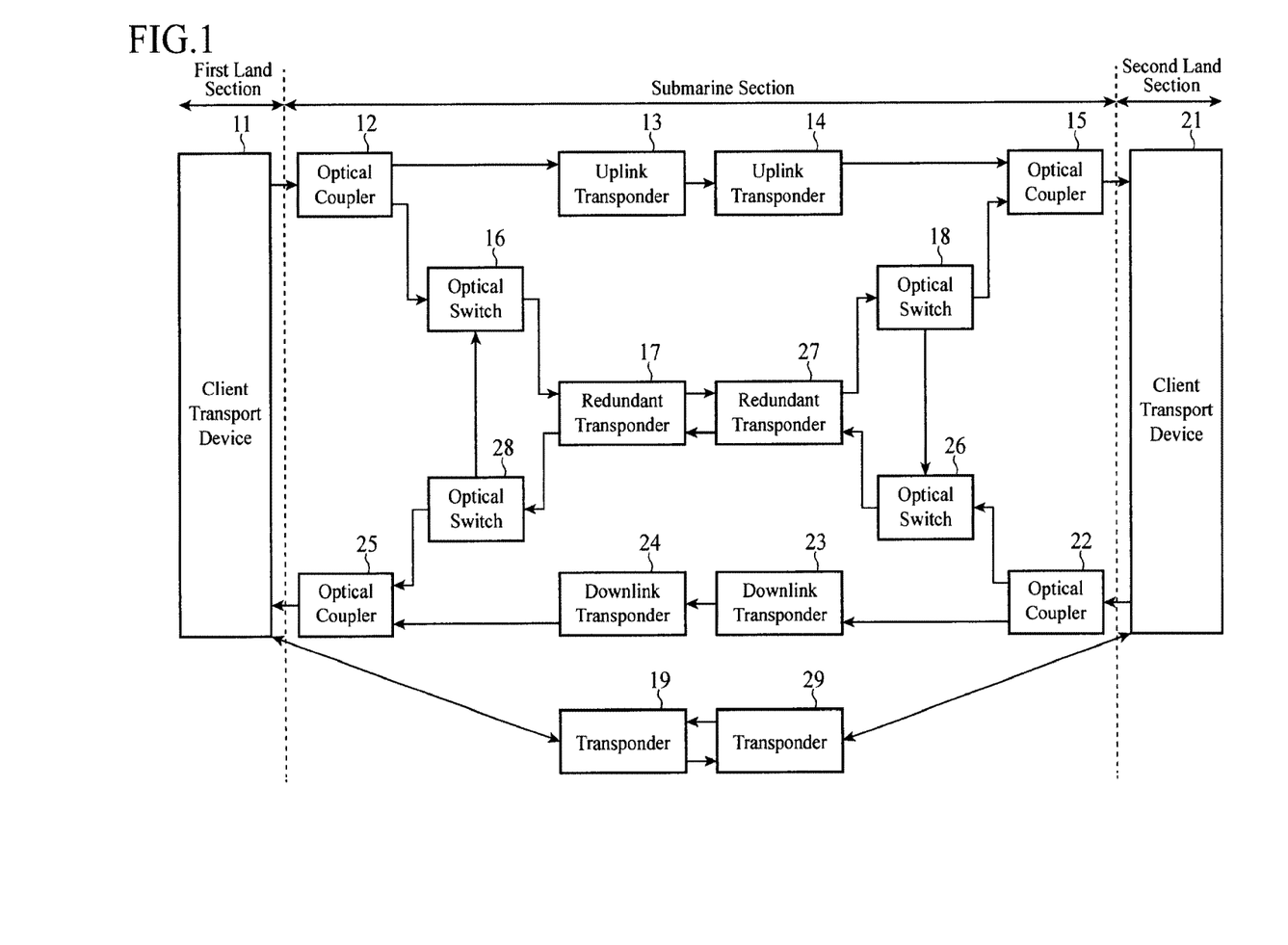
FIG. 1 is an outline diagram showing the configuration of an optical transport system in accordance with Embodiment 1 of the present invention.

FIG. 1 is an outline diagram showing the configuration of an optical transport system in accordance with Embodiment 1 of the present invention.

In this optical transport system, as shown in FIG. 1, a client transport device 11 and a client transport device 21 which are pieces of network protection equipment (NPE) are placed in a first land section and in a second land section, respectively, and perform optical transport communications via land terminal stations placed in a submarine section.

In a land terminal station on a first land section side, an optical coupler 12, an uplink transponder 13, an optical switch 16, a redundant transponder 17, a downlink transponder 24, an optical coupler 25, an optical switch 28, and a monitoring control unit (not shown) are disposed. In a land terminal station on a second land section side, an uplink transponder 14, an optical coupler 15, an optical switch 18, an optical coupler 22, a downlink transponder 23, an optical switch 26, a redundant transponder 27, and a monitoring control unit (not shown) are disposed.

The uplink transponder 13 and the uplink transponder 14 are opposed to construct an uplink transport path, and the downlink transponder 23 and the downlink transponder 24 are opposed to construct a downlink transport path. The redundant transponder 17 and the redundant transponder 27 are opposed to construct a redundant system uplink transport path and a redundant system downlink transport path.

The client transport device 11 has an output port connected to the optical coupler 12. The optical coupler 12 has an output port connected to the uplink transponder 13, and another output port connected to the optical switch 16. The optical switch 16 has input ports respectively connected to the optical coupler 12 and the optical switch 28, and selects one of them as an input source thereof according to a control signal from the monitoring control unit. The optical switch 16 further has an output port connected to the redundant transponder 17.

The uplink transponder 13 has an output port connected to the uplink transponder 14, which is opposite thereto, via an optical submarine cable, and the uplink transponder 14 has an output port connected to the optical coupler 15. The optical coupler 15 has input ports respectively connected to the uplink transponder 14 and the optical switch 18, and an output port connected to the client transport device 21.

On the other hand, the client transport device 21 has an output port connected to the optical coupler 22, and the optical coupler 22 has an output port connected to the downlink transponder 23, and another output port connected to the optical switch 26. The optical switch 26 has input ports respectively connected to the optical coupler 22 and the optical switch 18, and selects one of them as an input source thereof according to a control signal from the monitoring control unit. The optical switch 26 further has an output port connected to the redundant transponder 27.

The downlink transponder 23 has an output port connected to the downlink transponder 24, which is opposite thereto, via an optical submarine cable, and the downlink transponder 24 has an output port connected to the optical coupler 25. The optical coupler 25 has input ports respectively connected to the downlink transponder 24 and the optical switch 28, and an output port connected to the client transport device 11.

Further, the transponder 19 and the transponder 29 are connected to the client transport device 11 and the client transport device 21, respectively, like the above-mentioned uplink transponders 13 and 24, and the above-mentioned uplink transponders 14 and 23, and form another transport path, in the submarine section, between the client transport device 11 and the client transport device 21.

Although all of the redundant transponders 17 and 27 and the transponders 19 and 29 which form the other transport path include transponders associated with uplink/downlink which correspond to the uplink transponder 13 and the downlink transponder 24, or the uplink transponder 14 and the downlink transponder 23, they are illustrated while the transponders associated with uplink/downlink are not shown.

The client transport device 11 outputs a client signal to the optical coupler 12, and receives outputted light (client signal) from the optical coupler 25. When a failure (line failure) occurs in the land section, for example, between the optical coupler 25 and the client transport device 11, the client transport device 11 transmits a client signal in which the APS/PCC bytes in an ODU area which complies with the ITU-T recommendation G.709 are changed, via the transport path passing through the uplink transponders 13 and 14 (or the transponders 19 and 29), to perform switching control (maintenance service switching) of the output of the client transport device 21. As a result, the transport path of a client signal from the client transport device 21 is switched from the downlink transponders 23 and 24 to the other transport path formed of the transponders 29 and 19.

Similarly, the client transport device 21 outputs a client signal to the optical coupler 22, and receives outputted light from the optical coupler 15. When a failure (line failure) occurs in the land section, for example, between the optical coupler 15 and the client transport device 21, the client transport device 21 transmits a client signal in which the APS/PCC bytes in an ODU area which complies with the ITU-T recommendation G.709 are changed, via the transport path passing through the downlink transponders 23 and 24 (or the transponders 29 and 19), to perform switching control (maintenance service switching) of the output of the client transport device 11. As a result, the transport path of a client signal from the client transport device 11 is switched from the uplink transponders 13 and 14 to the other transport path formed of the transponders 19 and 29.

The optical coupler 12 divides the outputted light which is the client signal from the client transport device 11 into two parts, and outputs these parts to the uplink transponder 13 and the optical switch 16.

Similarly, the optical coupler 22 divides the outputted light which is the client signal from the client transport device 21 into two parts, and outputs these parts to the downlink transponder 23 and the optical switch 26.

The uplink transponder 13 generates an OTU frame including the client signal from the optical coupler 12, and transmits the OTU frame to the uplink transponder 14 via an optical submarine cable. At that time, the uplink transponder stores maintenance information in the OTU overhead of the OTU frame generated thereby on the basis of a control signal from the monitoring control unit. Further, when a failure occurs in the submarine section, the uplink transponder 13 notifies a failure notification warning showing that the failure has occurred to the monitoring control unit. Similarly, the downlink transponder 23 generates an OTU including the client signal from the optical coupler 22, and transmits the OTU frame to the downlink transponder 24 via an optical submarine cable. At that time, the downlink transponder stores maintenance information in the OTU overhead of the OTU frame generated thereby on the basis of a control signal from the monitoring control unit. Further, when a failure occurs in the submarine section, the downlink transponder 23 notifies a failure notification warning showing that the failure has occurred to the monitoring control unit.

The uplink transponder 14 terminates the OTU frame received from the uplink transponder 13, and outputs the client signal to the optical coupler 15. At that time, the contents of the OTU overhead are notified to the monitoring control unit. Further, when a failure occurs in the submarine section, the uplink transponder 14 notifies a failure notification warning showing that the failure has occurred to the monitoring control unit.

Similarly, the downlink transponder 24 terminates the OTU frame received from the downlink transponder 23, and outputs the client signal to the optical coupler 25. At that time, the contents of the OTU overhead are notified to the monitoring control unit. Further, when a failure occurs in the submarine section, the downlink transponder 24 notifies a failure notification warning showing that the failure has occurred to the monitoring control unit.

The optical coupler 15 outputs the outputted light (client signal) from the uplink transponder 14 or the optical switch 18 to the client transport device 21.

Similarly, the optical coupler 25 outputs the outputted light (client signal) from the downlink transponder 24 or the optical switch 28 to the client transport device 11.

The optical switch 16 outputs the outputted light from the optical coupler 12 or the optical switch 28 to the redundant transponder 17. The optical switch selects the optical coupler 12 or the optical switch 28 as an input source thereof according to a control signal from the monitoring control unit.

Similarly, the optical switch 26 outputs the outputted light from the optical coupler 22 or the optical switch 18 to the redundant transponder 27. The optical switch selects the optical coupler 22 or the optical switch 18 as an input source thereof according to a control signal from the monitoring control unit.

The redundant transponder 17 generates either an OTU frame including the client signal from the optical switch 16 or an OTU frame not including the client signal, and transmits the OTU frame to the redundant transponder 27 via an optical submarine cable. At that time, the redundant transponder stores maintenance information in the OTU overhead of the OTU frame generated thereby on the basis of a control signal from the monitoring control unit. The redundant transponder further terminates the OTU frame received from the redundant transponder 27, and outputs the client signal to the optical switch 28. At that time, the contents of the OTU overhead are notified to the monitoring control unit.

Similarly, the redundant transponder 27 generates either an OTU frame including the client signal from the optical switch 26 or an OTU frame not including the client signal, and transmits the OTU frame to the redundant transponder 17 via an optical submarine cable. At that time, the redundant transponder stores maintenance information in the OTU overhead of the OTU frame generated thereby on the basis of a control signal from the monitoring control unit. The redundant transponder further terminates the OTU frame received from the redundant transponder 17, and outputs the client signal to the optical switch 18. At that time, the contents of the OTU overhead are notified to the monitoring control unit.

The optical switch 18 outputs the outputted light from the redundant transponder 27 to the optical coupler 15 or the optical switch 26. The optical switch selects the optical coupler 15 or the optical switch 26 as an output destination thereof according to a control signal from the monitoring control unit.

Similarly, the optical switch 28 outputs the outputted light from the redundant transponder 17 to the optical coupler 25 or the optical switch 16. The optical switch selects the optical coupler 25 or the optical switch 16 as an output destination thereof according to a control signal from the monitoring control unit.

The transponders 19 has the same functions as the above-mentioned uplink transponder 13 and the above-mentioned downlink transponder 24, and the transponder 29 has the same functions as the above-mentioned uplink transponder 14 and the above-mentioned downlink transponder 23.

Figure 2:
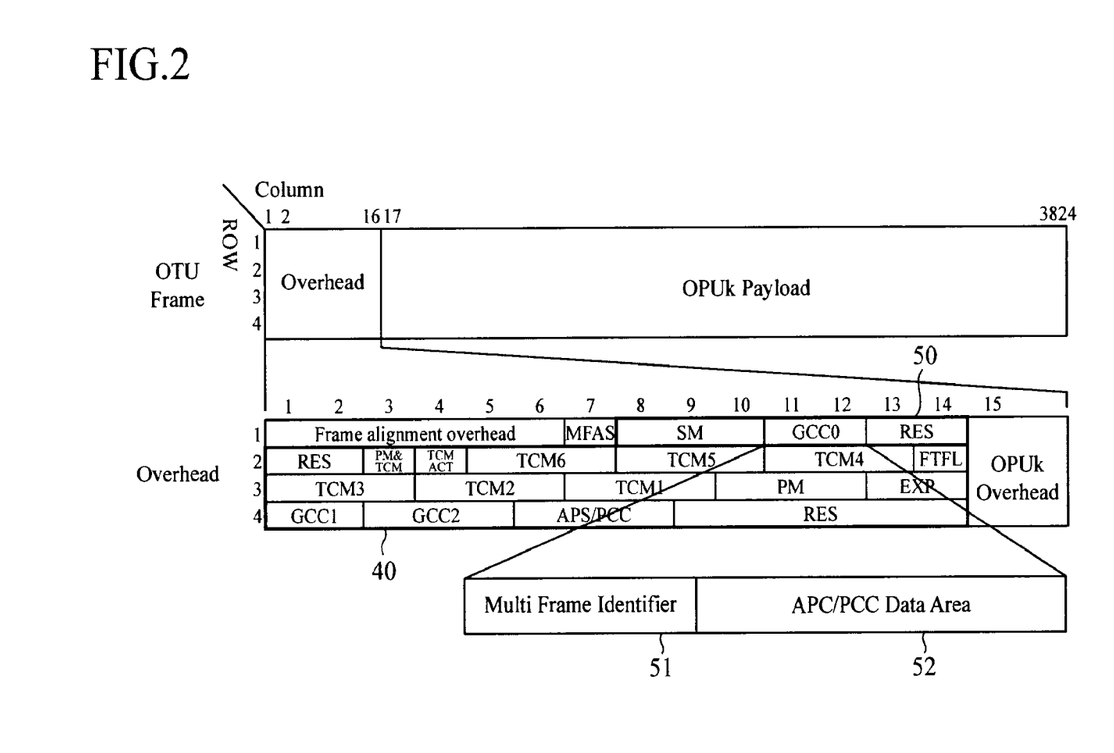
FIG. 2 is an outline diagram of overhead mapping of an OTU frame in Embodiment 1 of the present invention.

Next, overhead mapping of an OTU frame for use in the optical transport system configured as above is shown in FIG. 2.

In the optical transport system in accordance with Embodiment 1, as shown in FIG. 2, the maintenance information (switching information) about the submarine section is stored in a General Communication Channel 0 (GCC0) area mapped to the portions denoted by Row #1 and Columns #11 and #12 of OTU overheads (OTU areas) 50. Further, the maintenance information (switching information) about a land section is stored in APS/PCC bytes mapped to the portions denoted by Row #4 and Columns #5 to #8 of ODU overheads (ODU areas) 40, as usual.

According to the ITU-T recommendation G.709 standard, the GCC0 area is used as a band for arbitrary data communications. Because this GCC0 area is in an OTU area generated and terminated between adjacent optical transport devices (transponders), this GCC0 is used while being closed within the submarine section, rewriting of data in the OTU area is performed again when transmission from the submarine section to a land section is performed. Therefore, even if the maintenance information is stored in the GCC0 area, no influence is imposed on the client transport devices in the land sections.

In the optical transport system in accordance with Embodiment 1, the maintenance information about the submarine section consists of multi frame identifiers 51 for identifying multiple frames, and an APS/PCC data area 52 that stores the four bytes of APS/PCC value corresponding to the multi frame identifiers 51.

According to the ITU-T recommendation G.709 standard, while the number of bytes of the APS/PCC data area in the ODU area are defined to be four bytes (Row #4 and Columns #5 to #8), it is only defined that the GCC0 area has two bytes (Row#1 and Columns #11 and #12) as a whole, and therefore all (four bytes) of the maintenance information cannot be stored if the GCC0 area is simply used just as it is. To solve this problem, by multi-framing the GCC0 area and transmitting the four bytes of maintenance information by using three continuous OTU frames, the storage and communications of all of the maintenance information are implemented.

Figure 3:
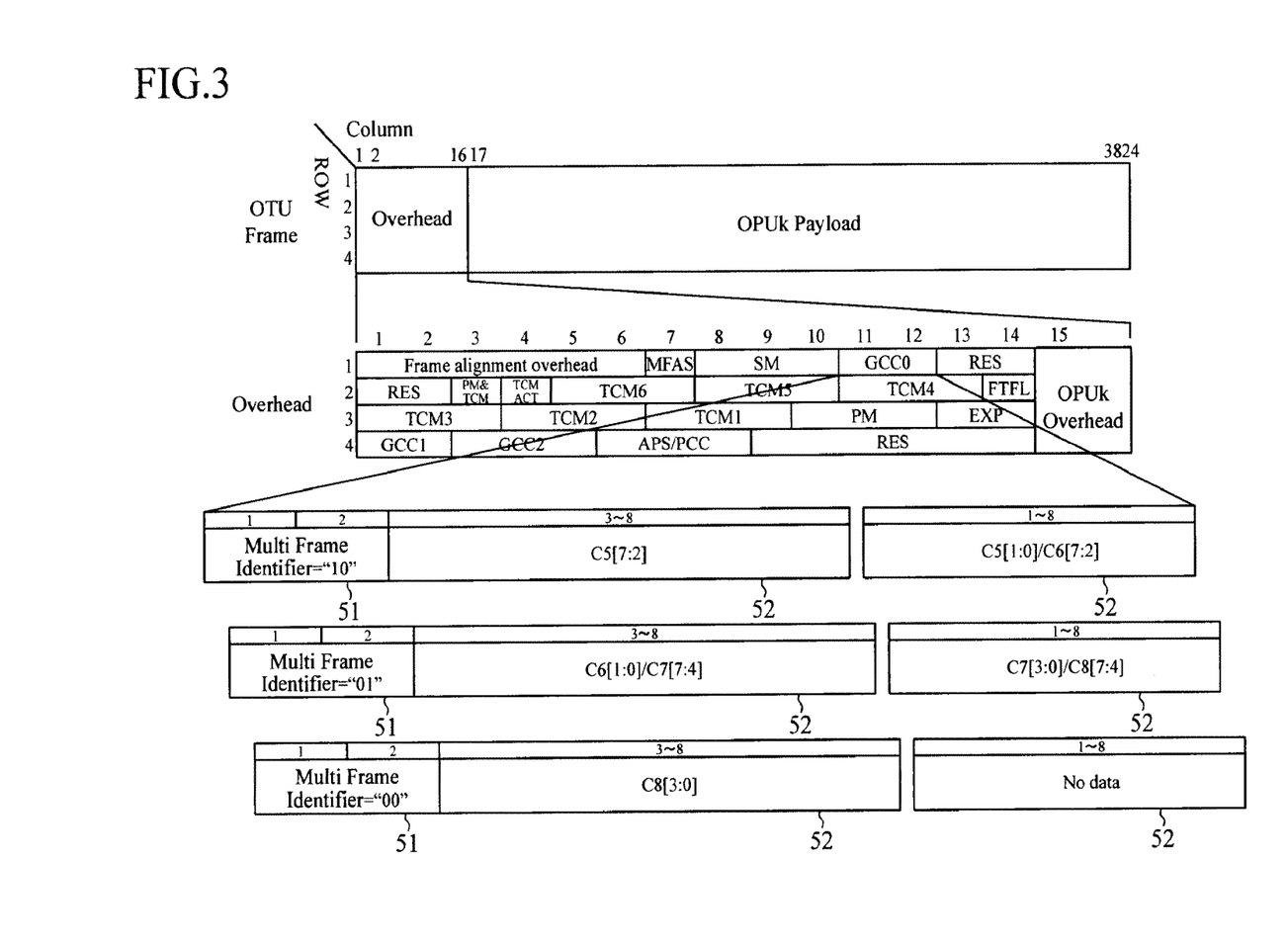
FIG. 3 is a mapping diagram of the GCC0 area of an OTU frame in Embodiment 1 of the present invention.

In FIG. 3, overhead mapping of inserting each multi frame identifier 51 into Column #11 in Embodiment 1, and multi-framing the GCC0 area is shown. A 2-bit area for each multi frame identifier 51 is ensured in the head of the bit sequence of Column #11, so that "10", "01", and "00" are inserted into the multi-framed three GCC0 areas in order. Then, into the APS/PCC data area 52 which consists of the lower 14-bit areas (the remaining 6 bits of Column #11 and the 8 bits of Column #12) of the multi-framed three GCC0 areas, the APS/PCC value (32 bits corresponding to C5[7:0], C6[7:0], C7[7:0], and C8[7:0] of the APS/PCC bytes) is inserted in order.

Through the above-mentioned process, the four bytes of APS/PCC value can be stored in the multi-framed GCC0 areas. FIG. 3 shows an example, and the value of each multi frame identifier 51 is arbitrary.

Next, operations of the optical transport system configured as above will be explained. First, an operation in a normal operation state will be explained by referring to FIG. 1. Hereafter, a case in which a client signal is transmitted from the client transport device 11 to the client transport device 21 will be shown.

When the optical transport system is in the normal operation state, a client signal outputted from the client transport device 11 is first inputted to the optical coupler 12 in the submarine section. Outputted light (client signal) from the optical coupler 12 is then inputted to the uplink transponder 13 and the optical switch 16.

Then, the uplink transponder 13 generates an OTU frame including the client signal from the optical coupler 12, and transmits the OTU frame to the uplink transponder 14, which is opposite thereto, via the optical submarine cable. After that, the uplink transponder 14 terminates the OTU frame received from the uplink transponder 13, and inputs the client signal to the client transport device 21 via the optical coupler 15.

On the other hand, in the redundant system (the optical switches 16, 18, 26, and 28 and the transponders 17 and 27) in the submarine section, according to a control signal from the monitoring control unit, the optical switch 16 selects the optical switch 28 as the input source thereof, and the optical switch 28 selects the optical switch 16 as the output destination thereof. Further, the optical switch 26 selects the optical switch 18 as the input source thereof, and the optical switch 18 selects the optical switch 26 as the output destination thereof. As a result, the four optical switches 16, 18, 26, and 28 and the two redundant transponders 17 and 27 which construct the redundant system in the submarine section are configured to have a form in which a light signal loops through them.

In the normal operation state, because the optical switch 16 selects the optical switch 28 as the input source thereof, the client signal from the optical coupler 12 is not inputted to the redundant transponder 17. The redundant transponder 17 generates an OTU frame not including the client signal, and transmits the OTU frame to the redundant transponder 27, which is opposite thereto, via the optical submarine cable. The redundant transponder 27 terminates the OTU frame received from the redundant transponder 17, and inputs the outputted light (not including the client signal) to the optical switch 18.

Because the optical switch 18 selects the optical switch 26 as the output destination thereof, the outputted light from the optical switch 18 is not inputted to the optical coupler 15. The outputted light of the optical switch 18 is inputted to the redundant transponder 27 via the optical switch 26.

Similarly, the redundant transponder 27 generates an OTU frame not including the client signal, and transmits the OTU frame to the redundant transponder 17, which is opposite thereto, via the optical submarine cable. The redundant transponder 17 terminates the OTU frame received from the redundant transponder 27, and inputs the outputted light to the optical switch 28.

Because the optical switch 28 selects the optical switch 16 as the output destination thereof, the outputted light from the optical switch 28 is not inputted to the optical coupler 25. The outputted light of the optical switch 28 is inputted to the redundant transponder 17 via the optical switch 16. In this way, in the normal operation state, the light signal loops through the redundant system.

Figure 4:
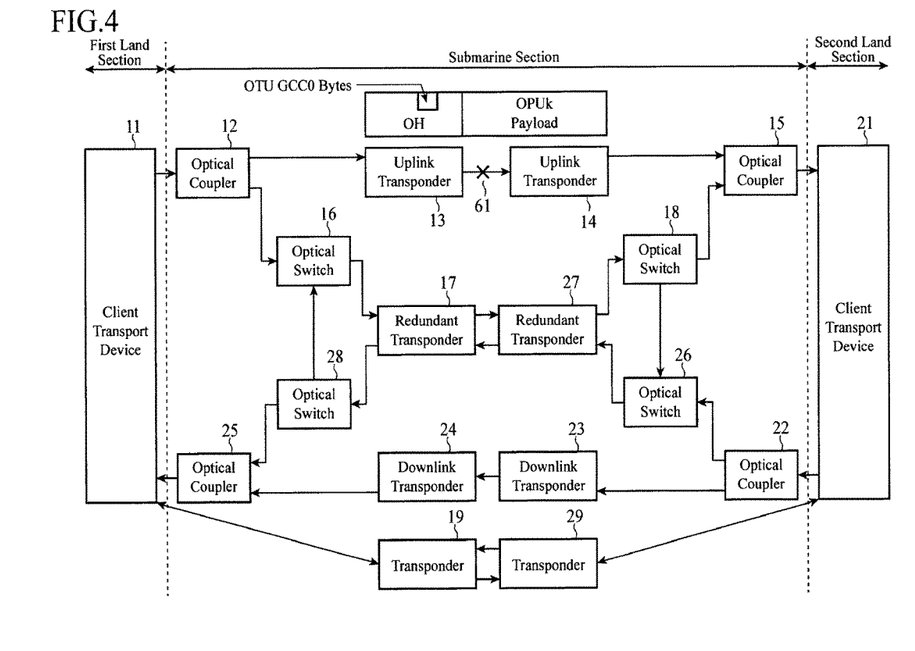
FIG. 4 is an outline diagram showing maintenance service switching in a submarine section in the optical transport system in accordance with Embodiment 1 of the present invention.

Next, an operation (maintenance service switching) in a case in which a failure occurs in the uplink transport path of the submarine section (includes a case in which a failure occurs in the uplink transponders 13 and 14 currently being used) will be explained by referring to FIG. 4. Hereafter, a case in which a line failure 61 occurs in the submarine section will be shown.

When a line failure 61 occurs in the submarine section, the uplink transponder 14 notifies a failure notification warning showing that the line failure has occurred to the monitoring control unit, first. The monitoring control unit detects the line failure 61 on the basis of this notification, and notifies a command for storing the maintenance information in an OTU frame to the redundant transponder 27 (transmits a control signal). The redundant transponder 27 receives the control signal from the monitoring control unit, multi-frames a GCC0 area and generates OTU frames in which the maintenance information is stored, as mentioned above, and transmits the OTU frames to the redundant transponder 17. At that time, as the OTU frames which are transmitted, OTU frames each of which is looped and transmitted in the redundant system and each of which does not include a client signal can be used. Further, the optical switches 18 and 26 select the optical coupler 15 as the output destination of the optical switch 18 and the optical coupler 22 as the input source of the optical switch 26, respectively, under control by the monitoring control unit.

Then, the redundant transponder 17 terminates the OTU frames received from the redundant transponder 27, and the maintenance information stored in the OTU overheads is notified to the monitoring control unit. Under control by the monitoring control unit on the basis of this maintenance information, the optical switches 16 and 28 select the optical coupler 12 as the input source of the optical switch 16 and the optical coupler 25 as the output destination of the optical switch 28.

As a result, the transport path of main signals (including the client signal) between the client transport device 11 and the client transport device 21 is switched to the redundant system. More specifically, maintenance service switching in the optical transport system is completed.

At that time, even if the client transport device 11 in the first land section selects the OUT interface as the client interface, because the uplink transponders 13 and 14 and the redundant transponders 17 and 27 in the submarine section notify the maintenance information by using OTU overheads, but do not terminate ODU overheads, the APS/PCC bytes in an ODU area are not rewritten, and, even when a failure occurs in the submarine section, transparent communications of ODU areas can be performed.

Figure 5:
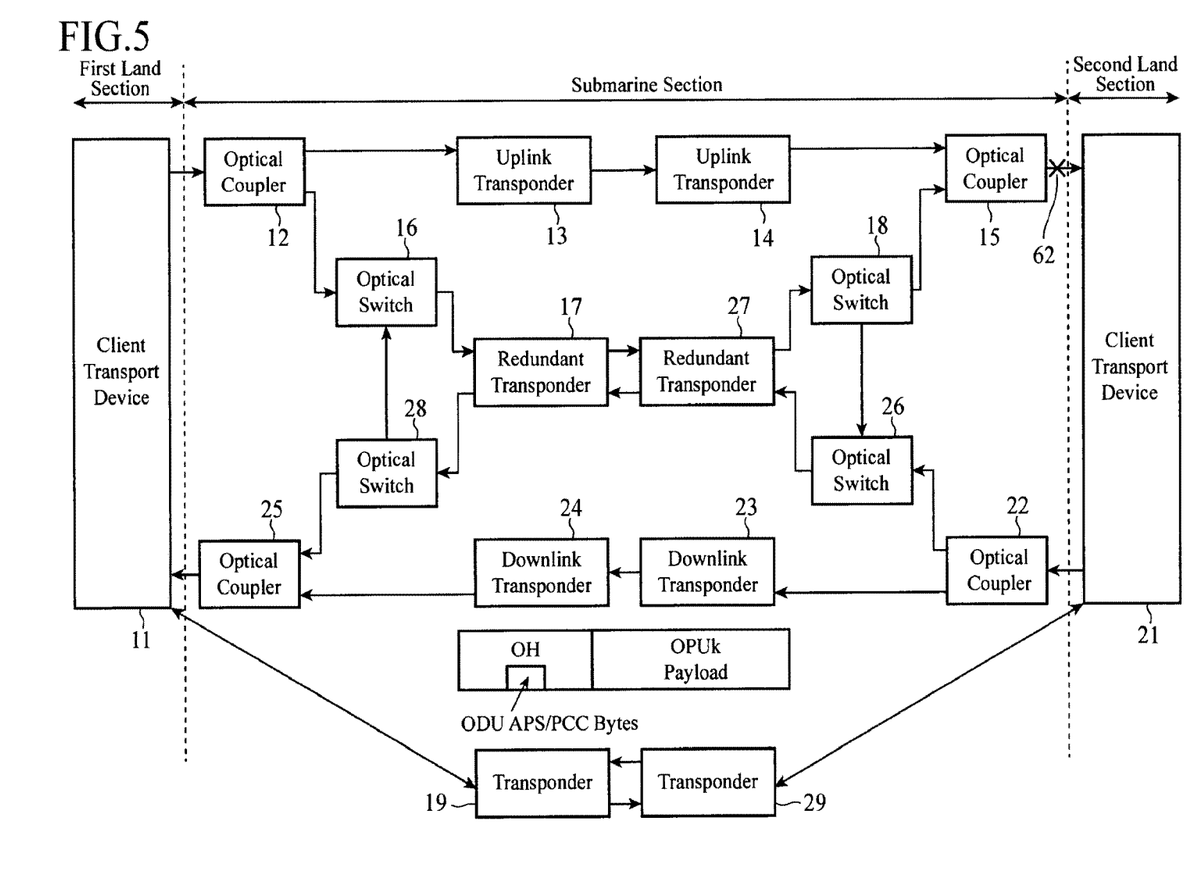
FIG. 5 is an outline diagram showing maintenance service switching in a land section in the optical transport system in accordance with Embodiment 1 of the present invention.

Next, an operation in a case in which a failure occurs in a land section will be explained by referring to FIG. 5. Hereafter, a case in which a line failure 62 occurs in a land section will be shown.

When a line failure 62 occurs in the land section, the client transport device 21 which has detected the failure switches the client signal output destination thereof from the optical coupler 22 to the transponder 29 which constructs the other transport path, and also transmits a client signal storing the maintenance information about the land section in the APS/PCC bytes of an ODU area to the client transport device 11 according to the ITU-T recommendation G.709 standard. The client transport device 11 which has received the client signal storing the above-mentioned maintenance information about the land section switches the client signal output destination thereof from the optical coupler 12 to the transponder 19 which constructs the other transport path. As a result, the transport path of the client signal from the client transport device 11 to the client transport device 21 is switched from the uplink transponders 13 and 14 to the other transport path formed of the transponders 19 and 29.

At that time, because the transponders in the submarine section perform transparent communications of ODU areas even when a failure has occurred in the submarine section, communications of the maintenance information about a land section are not interfered with.

As mentioned above, because the optical transport system in accordance with this Embodiment 1 is configured in such a way as to, when a failure occurs in the submarine section, store the maintenance information in the GCC0 areas of OTU overheads, the maintenance service switching function for land section and the maintenance service switching function for submarine section are enabled to coexist for each of the client transport devices 11 and 21.

Embodiment 2

Figure 6:
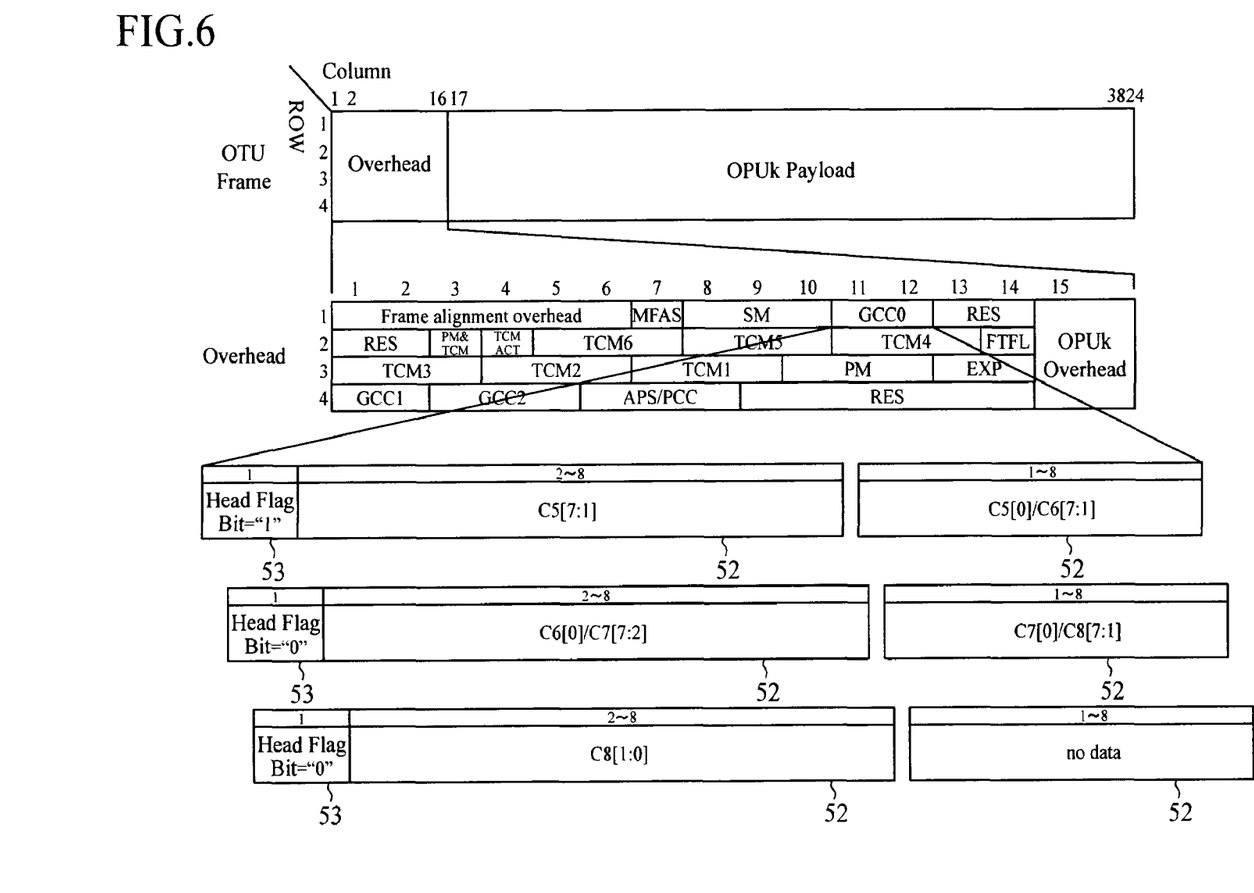
FIG. 6 is a mapping diagram of the GCC0 area of an OTU frame in Embodiment 2 of the present invention.

In Embodiment 1, the case of, when a line failure occurs in a submarine section of an optical transport system and maintenance information is stored in an OTU overhead, storing each multi frame identifier 51 in the two bits of the head of an overhead is shown as the method of multi-framing the GCC0 area. In contrast with this, in Embodiment 2, a case of storing information (head flag bits 53) showing the heads of multiple frames in the 1-bit top bit areas of GCC0 areas is shown. More specifically, in the optical transport system in accordance with Embodiment 2, the maintenance information about the submarine section consists of the head flag bits 53 showing the heads of the multiple frames, and an APS/PCC data area 52 in which four bytes of APS/PCC value are stored.

In FIG. 6, overhead mapping of inserting each head flag 53 into Column #11 in Embodiment 2, and multi-framing the GCC0 area is shown. A 1-bit area for each head flag 53 is ensured in the head of the bit sequence of Column #11, so that "1", "0", and "0" are inserted into the multi-framed three GCC0 areas in order. Then, into the APS/PCC data area 52 which consists of the lower 15-bit areas (the remaining 7 bits of Column #11 and the 8 bits of Column #12) of the multi-framed three GCC0 areas, the APS/PCC value (32 bits corresponding to C5[7:0], C6[7:0], C7[7:0], and C8[7:0] of the APS/PCC bytes) is inserted in order.

Through the above-mentioned process, the four bytes of APS/PCC value can be stored in the multi-framed GCC0 areas.

In the optical transport system in accordance with Embodiment 2, each transponder that receives and terminates an OTU frame includes a counter to identify how manieth frame from the head of the multiple frames the read frame is. The transponder identifies each of the multiple frames correctly by resetting the counter in response to the reception of a fame whose head flag 53 is "1", and reads the maintenance information stored in the GCC0 areas. The read maintenance information is notified to the monitoring control unit, and maintenance service switching in the optical transport system is performed, like in the case of Embodiment 1.

As mentioned above, because the optical transport system in accordance with this Embodiment 2 is configured in such a way as to store the head flag bits 53 in GCC0 areas to provide multiple frames, and store maintenance information in the GCC0 areas, there can be provided an advantage of enabling the maintenance service switching function for land section and the maintenance service switching function for submarine section to coexist in the optical transport system, like in the case of Embodiment 1. In addition, because a portion other than the top 1 bit of each frame can be used as a data area, there is provided an advantage of being able to insert a large amount of data, e.g., simultaneously insert other information including data other than the APS/PPC value, and so on in the GCC0 areas.

Figure 7:
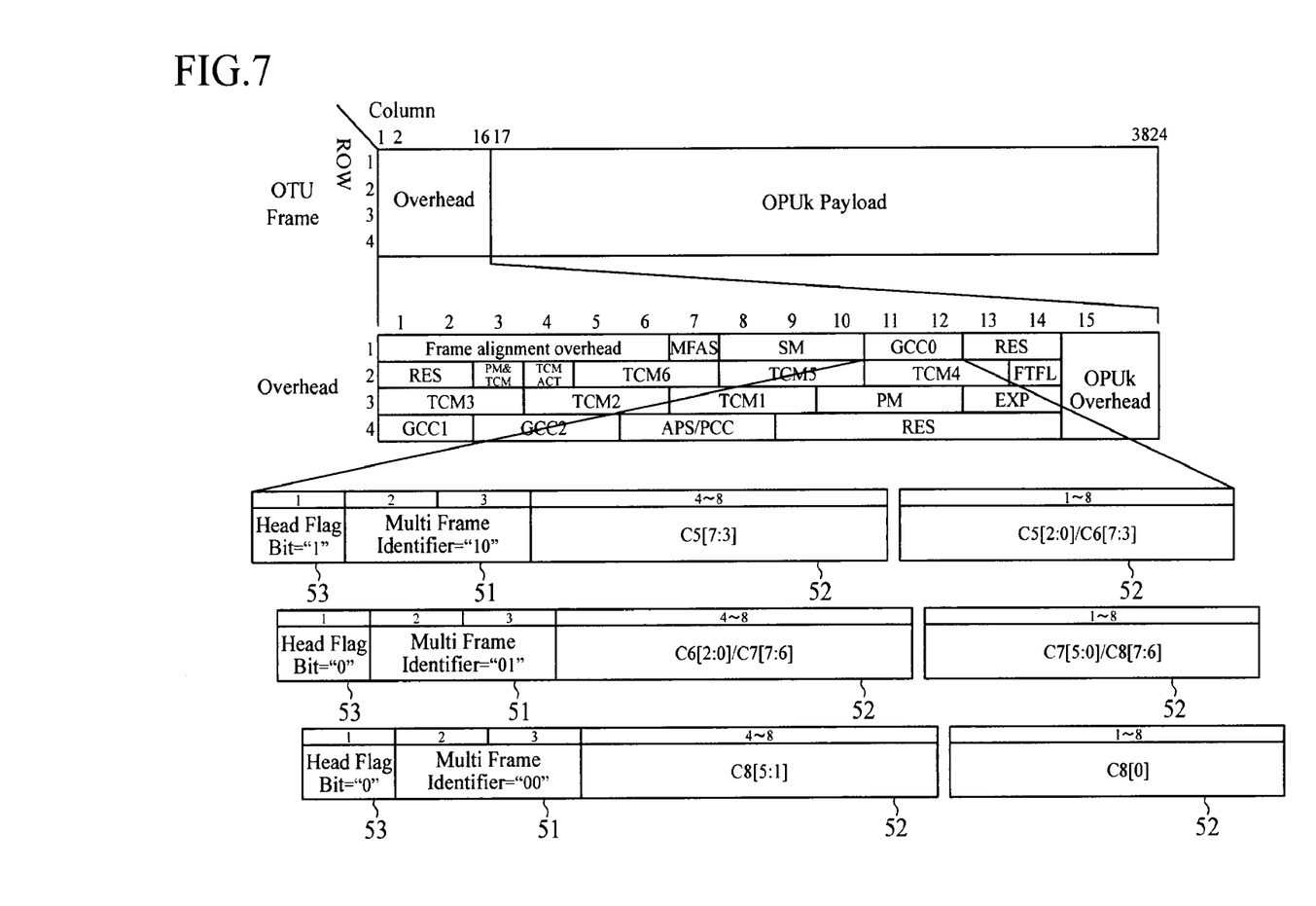
FIG. 7 is a mapping diagram showing another example of the GCC0 area of an OTU frame in Embodiment 2 of the present invention.
Figure 8:
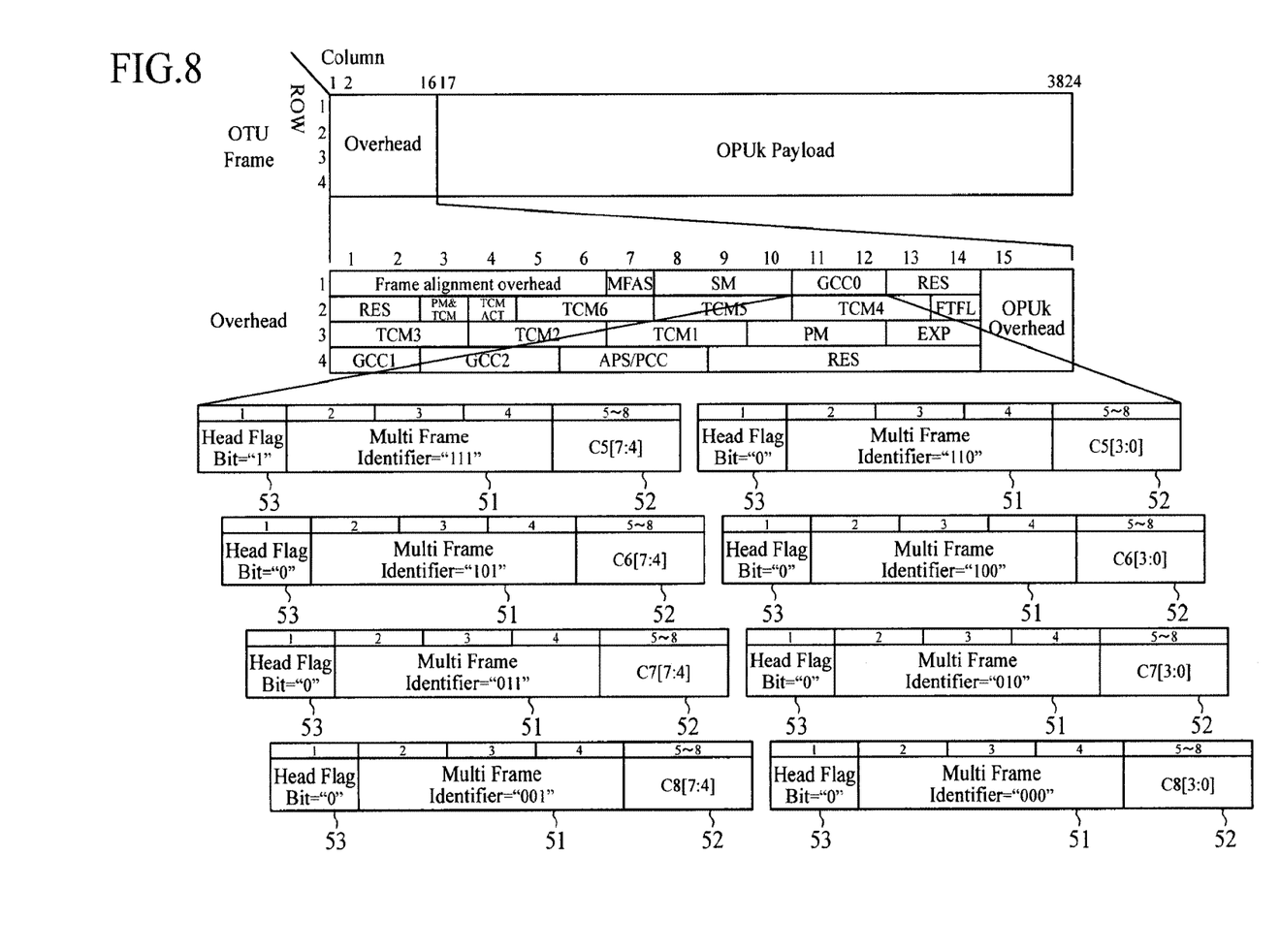
FIG. 8 is a mapping diagram showing a further example of the GCC0 area of an OTU frame in Embodiment 2 of the present invention.

Further, as another example of the inserting operation of storing data (maintenance information) in the OTU overheads, as shown in FIGS. 7 and 8, a combination of head flag bits 53 and multi frame identifiers 51 can also be used. In the example of FIG. 8, each head bit flag 53 and each multi frame identifier 51 for identifying one of multiple frames are defined not only in Column #11 but also in Column #12. In this example of data insertion, each head flag bit 53 consists of one bit and each multi frame identifier 51 consists of three bits, and four OTU frames are used in order to transmit four bytes of APS/PCC value. According to this method, the multiple frames can be identified more correctly, and there can be provided an advantage of enabling the maintenance service switching function for land section and the maintenance service switching function for submarine section to coexist in the optical transport system, like in the case of Embodiment 1.

Embodiment 3

Figure 9:
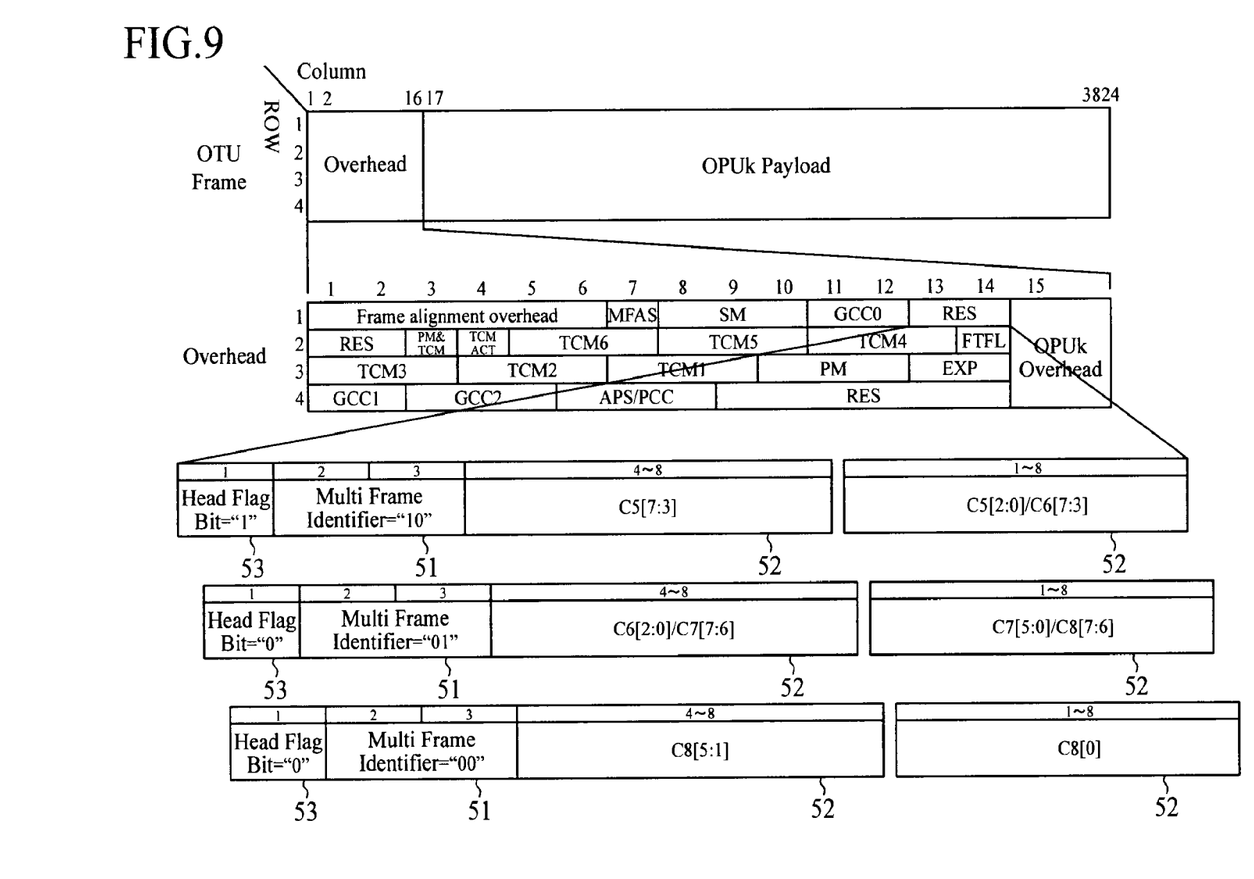
FIG. 9 is a mapping diagram of the RES area of an OTU frame in Embodiment 3 of the present invention.

In Embodiments 1 and 2, the case in which, when a line failure occurs in the submarine section of the optical transport system, maintenance information is stored in the GCC0 areas of OTU overheads is shown. In contrast with this, in Embodiment 3, a case of storing maintenance information (switching information) about the submarine section in Reserved for future international standardization (RES) areas mapped onto the portions denoted by Row #1 and Columns #13 and #14 of OTU overheads (OTU areas) will be shown.

In FIG. 9, overhead mapping of inserting each head flag 53 and each multi frame identifier 51 into Column #13 in Embodiment 3, and multi-framing the RES area is shown. A 1-bit area for each head flag 53 and a 2-bit area for each multi frame identifier 51 are ensured in the head of the bit sequence of Column #13, so that a head flag "1" and a multi frame identifier "10", a head flag "0" and a multi frame identifier "01", and a head flag "0" and a multi frame identifier "00" are inserted into the multi-framed three RES areas in order. Then, into an APS/PCC data area 52 which consists of the lower 13-bit areas (the remaining 5 bits of Column #13 and the 8 bits of Column #14) of the multi-framed three RES areas, the APS/PCC value (32 bits corresponding to C5[7:0], C6[7:0], C7[7:0], and C8[7:0] of the APS/PCC bytes) is inserted in order.

Through the above-mentioned process, the four bytes of APS/PCC value can be stored in the multi-framed RES areas.

In this case, because each RES area is 2 bytes, like each GCC0 area, as multi framing and data insertion at the time of storing maintenance information in OTU frames, the method shown in Embodiments 1 and 2, other than the above-mentioned method, i.e., the method of inserting only multi frame identifiers or head flags can be used similarly. Although the GCC0 areas may be used for another application other than the optical transport in optical transmission devices in the submarine section, the RES areas can be used just as they are because the RES areas are not defined in the ITU-T recommendation. In accordance with the present invention, the optical transport system can be configured in which the maintenance service switching function for land section and the maintenance service switching function for submarine section coexist without changing the current configuration of transport systems with optical submarine cables.

As mentioned above, because the optical transport system in accordance with this Embodiment 3 is configured in such a way as to multi-frame the RES area to store maintenance information, there can be provided an advantage of enabling the maintenance service switching function for land section and the maintenance service switching function for submarine section to coexist in the optical transport system, like in the case of Embodiment 1.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The optical transport system in accordance with the present invention enables the maintenance service switching function for land section and the maintenance service switching function for submarine section to coexist by storing maintenance information in OTU overheads which are not used for storage of maintenance information about a client transport device (land section), and is suitable for use as an optical transport system that causes maintenance devices each of which uses two types of maintenance service switching protocols to coexist, and so on.

EXPLANATIONS OF REFERENCE NUMERALS

11 and 21 client transport device, 12, 15, 22, and 25 optical coupler, 13 and 14 uplink transponder, 23 and 24 downlink transponder, 17 and 27 redundant transponder, 16, 18, 26, and 28 optical switch, 19 and 29 transponder, 40 ODU overhead (ODU area), 50 OTU overhead (OTU area), 51 multi frame identifier, 52 APS/PCC data area, 61 line failure, and 62 line failure.

The invention claimed is:

1. An optical transport system that is connected to client transport devices each transmitting a client signal included in an OTU frame, said optical transport system transporting said OTU frame and comprising:
uplink transponders opposed to construct an uplink transport path to transport said OTU frame;
redundant uplink transponders opposed to construct a redundant system uplink transport path to transport said OTU frame;
redundant downlink transponders opposed to construct a redundant system downlink transport path to transport said OTU frame, wherein at least one of said redundant downlink transponders is configured to store maintenance information for a submarine section of said optical transport system in a first area of an OTU overhead of said OTU frame when a failure occurs in said submarine section and said OTU overhead of said OTU frame includes a second area different from said first area for storing maintenance information for a land section of said optical transport system; and
optical switches connected between (i) said client transport devices and (ii) said uplink transport path and said redundant system uplink transport path and configured to switch between said uplink transport path and said redundant system uplink transport path on a basis of said maintenance information for said submarine section.

2. The optical transport system according to claim 1, wherein said first area is a GCC0 area of said OTU overhead.

3. The optical transport system according to claim 1, wherein said first area is a RES area in a first row of said OTU overhead.

4. The optical transport system according to claim 2, wherein said at least one of said redundant downlink transponders dividedly stores said maintenance information for said submarine section in a plurality of said GCC0 areas which are multi-framed.

5. The optical transport system according to claim 4, wherein said at least one of said redundant downlink transponders multi-frames said maintenance information for said submarine section after division by storing said maintenance information for said submarine section after division in said plurality of GCC0 areas together with multi frame identifiers.

6. The optical transport system according to claim 4, wherein said at least one of said redundant downlink transponders multi-frames said maintenance information for said submarine section after division by storing said maintenance information for said submarine section after division in said plurality of GCC0 areas together with head flags showing heads of multiple frames.

7. The optical transport system according to claim 4, wherein said at least one of said redundant downlink transponders multi-frames said maintenance information for said submarine section after division by storing said maintenance information for said submarine section after division in said plurality of GCC0 areas together with head flags showing heads of multiple frames and multi frame identifiers.

8. The optical transport system according to claim 3, wherein said at least one of said redundant downlink transponders dividedly stores said maintenance information for said submarine section in a plurality of said RES areas which are multi-framed.

9. The optical transport system according to claim 8, wherein said at least one of said redundant downlink transponders multi-frames said maintenance information for said submarine section after division by storing said maintenance information for said submarine section after division in said plurality of RES areas together with multi frame identifiers.

10. The optical transport system according to claim 8, wherein said at least one of said redundant downlink transponders multi-frames said maintenance information for said submarine section after division by storing said maintenance information for said submarine section after division in said plurality of RES areas together with head flags showing heads of multiple frames.

11. The optical transport system according to claim 8, wherein said at least one of said redundant downlink transponders multi-frames said maintenance information for said submarine section after division by storing said maintenance information for said submarine section after division in said plurality of RES areas together with head flags showing heads of multiple frames and multi frame identifiers.

12. The optical transport system according to claim 1, wherein
said redundant system uplink transport path and said redundant system downlink transport path form a loop when said uplink transport path is connected to said client transport device, and
at least one of said redundant downlink transponders is configured to store said maintenance information for said submarine section in an OTU overhead of an OTU frame transported on said loop and transport said OTU frame.

13. The optical transport system according to claim 2, wherein
said redundant system uplink transport path and said redundant system downlink transport path form a loop when said uplink transport path is connected to said client transport device, and
at least one of said redundant downlink transponders is configured to store said maintenance information for said submarine section in an OTU overhead of an OTU frame transported on said loop and transport said OTU frame.

14. The optical transport system according to claim 3, wherein
said redundant system uplink transport path and said redundant system downlink transport path form a loop when said uplink transport path is connected to said client transport device, and
at least one of said redundant downlink transponders is configured to store said maintenance information for said submarine section in an OTU overhead of an OTU frame transported on said loop and transport said OTU frame.

* * * * *